US011353402B2

(12) United States Patent
Sugiyama et al.

(10) Patent No.: US 11,353,402 B2
(45) Date of Patent: Jun. 7, 2022

(54) SAMPLE OBSERVATION DEVICE AND SAMPLE OBSERVATION METHOD

(71) Applicant: HAMAMATSU PHOTONICS K.K., Hamamatsu (JP)

(72) Inventors: Norikazu Sugiyama, Hamamatsu (JP); Masanori Matsubara, Hamamatsu (JP); Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/629,220

(22) PCT Filed: Apr. 16, 2018

(86) PCT No.: PCT/JP2018/015745
§ 371 (c)(1),
(2) Date: Jan. 7, 2020

(87) PCT Pub. No.: WO2019/012771
PCT Pub. Date: Jan. 17, 2019

(65) Prior Publication Data
US 2020/0132603 A1 Apr. 30, 2020

(30) Foreign Application Priority Data
Jul. 11, 2017 (JP) .............................. JP2017-135426

(51) Int. Cl.
*G01N 21/64* (2006.01)
(52) U.S. Cl.
CPC ..... *G01N 21/6428* (2013.01); *G01N 21/6456* (2013.01); *G01N 2021/6439* (2013.01)
(58) Field of Classification Search
CPC ........... G01N 21/6428; G01N 21/6456; G01N 2021/6539
See application file for complete search history.

(56) References Cited

U.S. PATENT DOCUMENTS 5,149,972 A * 9/1992 Fay .................... G01N 21/6458
250/372
6,512,236 B2 * 1/2003 Seville ............... G01N 21/6428
250/458.1
(Continued)

FOREIGN PATENT DOCUMENTS

CN 102667473 A 9/2012
JP H03-81648 A 4/1991
(Continued)

OTHER PUBLICATIONS

International Preliminary Report on Patentability dated Jan. 23, 2020 for PCT/JP2018/015745.
(Continued)

*Primary Examiner* — David P Porta
*Assistant Examiner* — Djura Malevic
(74) *Attorney, Agent, or Firm* — Faegre Drinker Biddle & Reath LLP

(57) ABSTRACT

A sample observation device includes a sample container that holds the sample stained with a first fluorescent substance and a solution including a second fluorescent substance, an irradiation unit that performs irradiation with first excitation light and second excitation light, a scanning unit that scans the sample container in one direction, an image formation unit that forms first fluorescent light from the sample and second fluorescent light from the solution, an imaging unit that outputs first image data based on the first fluorescent light and first image data based on the second fluorescent light, an image processing unit that generates a first fluorescent light image based on a plurality of pieces of first image data and a second fluorescent light image based on a plurality of pieces of second image data, and an analysis unit that specifies an area in which there is the sample on the
(Continued)

basis of the second fluorescent light image and sets an analysis area in the first fluorescent light image.

17 Claims, 11 Drawing Sheets

(56) References Cited

U.S. PATENT DOCUMENTS

| | | | |
|---|---|---|---|
| 8,582,203 B2 | 11/2013 | Dunsby | |
| 9,816,930 B2* | 11/2017 | Moriyama | A61B 1/00009 |
| 10,080,484 B2* | 9/2018 | Yang | G01J 3/4406 |
| 10,168,525 B2* | 1/2019 | Kim | H04N 5/2258 |
| 2002/0098588 A1* | 7/2002 | Sammak | G01N 21/6428 |
| | | | 436/172 |
| 2005/0001176 A1* | 1/2005 | Loney | G01N 33/58 |
| | | | 250/458.1 |
| 2005/0264776 A1* | 12/2005 | Baer | A45D 26/0014 |
| | | | 355/43 |
| 2009/0232370 A1* | 9/2009 | Adie | G06K 9/00127 |
| | | | 382/128 |
| 2011/0261446 A1* | 10/2011 | Dunsby | G02B 21/16 |
| | | | 359/380 |
| 2012/0200694 A1* | 8/2012 | Garsha | G01N 21/6456 |
| | | | 348/79 |
| 2013/0221240 A1* | 8/2013 | Kishima | A45D 33/02 |
| | | | 250/459.1 |
| 2016/0305883 A1* | 10/2016 | Betzig | G02B 21/06 |
| 2016/0341664 A1* | 11/2016 | Rothberg | H01S 5/0428 |
| 2017/0336326 A1* | 11/2017 | Sirat | G01N 21/636 |
| 2020/0177822 A1* | 6/2020 | Ohyama | G01N 21/47 |

FOREIGN PATENT DOCUMENTS

| | | |
|---|---|---|
| JP | 2015-127738 A | 7/2015 |
| WO | WO 2006/061640 A2 | 6/2006 |
| WO | WO-2013/146843 A1 | 10/2013 |
| WO | WO-2015/118843 A1 | 8/2015 |

OTHER PUBLICATIONS

De Caldwell et al., "Imaging of bacterial cells by fluorescence exclusion using scanning confocal laser microscopy", Journal of Microbiological Methods, Jun. 1, 1992, p. 249-p. 261.

Miriam S. Droste et al., "Noninvasive measurement of cell volume changes by negative staining", Journal of Biomedical Optics, Jan. 1, 2005, p. 064017.

Schicktanze, Simone et al., "Image-based Quantification of Apoptosis using the Operetta," Perkin Elmer, Application Note, 2009, pp. 1-4.

* cited by examiner

SAMPLE OBSERVATION DEVICE AND SAMPLE OBSERVATION METHOD

TECHNICAL FIELD

The present disclosure relates to a sample observation device and a sample observation method.

BACKGROUND ART

An example of a technology for observing a sample such as a cell includes a scheme described in Non-Patent Literature 1. In this scheme of the related art, a cell nucleus is stained with a fluorescent substance, and a position of the cell nucleus is specified on the basis of a fluorescent light image obtained by exciting the fluorescent substance. An area in which there is a sample is estimated on the basis of the specified position of the cell nucleus, and an analysis area is set.

PRIOR ART LITERATURE

Non-Patent Literature

[Non-Patent Literature 1] Perkin Elmer APPLICATION NOTE, "Image-based Quantification of Apoptosis using the Operetta"

SUMMARY OF INVENTION

Technical Problem

In the scheme of the related art described above, the area in which there is the sample is only estimated on the basis of the position of the cell nucleus, and it is difficult to say that the accuracy of specifying the analysis area is sufficient. In order to accurately perform analysis of the sample on the basis of an intensity of the fluorescent light, a technology capable of specifying the analysis area with sufficient accuracy is necessary.

The present disclosure has been made to solve the above-described problems, and an object of the present disclosure is to provide a sample observation device and a sample observation method capable of specifying an analysis area with sufficient accuracy.

Solution to Problem

A sample observation device according to an aspect of the present disclosure is a sample observation device for observing a sample using fluorescent light, the sample observation device including: a sample container that holds the sample stained with a first fluorescent substance in a well into which a solution including a second fluorescent substance has been injected; an irradiation unit that irradiates the well with first excitation light for exciting the first fluorescent substance and second excitation light for exciting the second fluorescent substance; a scanning unit that relatively scans the sample container in one direction crossing optical axes of the first excitation light and the second excitation light; an image formation unit that forms first fluorescent light generated in the sample due to the first excitation light and second fluorescent light generated in the solution due to the second excitation light as images; an imaging unit that captures at least a part of a light image of the first fluorescent light formed as an image by the image formation unit and outputs first image data, and captures at least a part of a light image of the second fluorescent light formed as an image by the image formation unit and outputs second image data; an image processing unit that generates a first fluorescent light image on the basis of a plurality of pieces of first image data obtained for the one direction, and generates a second fluorescent light image on the basis of a plurality of pieces of second image data obtained for the one direction; and an analysis unit that specifies an area in which there is the sample on the basis of the second fluorescent light image, sets an analysis area in the first fluorescent light image on the basis of the area in which there is the sample, and analyzes an intensity of fluorescent light in the analysis area.

In this sample observation device, the first fluorescent light image is generated on the basis of the first fluorescent light from the first fluorescent substance with which the sample is stained, and the second fluorescent light image is generated on the basis of the second fluorescent light from the second fluorescent substance included in the solution. The area in which there is the sample can be ascertained from this second fluorescent light image. Therefore, the sample can be analyzed with high accuracy on the basis of an intensity of the fluorescent light in the analysis area in the first fluorescent light image by specifying the area in which there is the sample on the basis of the second fluorescent light image and setting the analysis area in the first fluorescent light image on the basis of the area in which there is the sample.

Further, the image formation unit may include a switching unit that switches between a first fluorescence filter that transmits the first fluorescent light and a second fluorescence filter that transmits the second fluorescent light on an optical path for image formation. In this case, splitting of the first fluorescent light and the second fluorescent light can be realized with a simple configuration.

Further, the image formation unit may include a light splitting element that splits the first fluorescent light and the second fluorescent light, and the imaging unit may include a first photodetector that images at least a part of the first fluorescent light split by the light splitting element, and a second photodetector that images at least a part of the second fluorescent light split by the light splitting element. In this case, splitting of the first fluorescent light and the second fluorescent light can be realized with a simple configuration.

Further, the image formation unit may include a light splitting element that splits the first fluorescent light and the second fluorescent light, and the imaging unit may include a photodetector including a first imaging area that images at least a part of the first fluorescent light split by the light splitting element and a second imaging area that images at least a part of the second fluorescent light split by the light splitting element. In this case, splitting of the first fluorescent light and the second fluorescent light can be realized with a simple configuration.

Further, the first excitation light and the second excitation light may be planar light. In this case, the imaging unit can acquire the first image data and the second image data as two-dimensional data.

Further, the image formation unit may have an observation axis that is inclined with respect to an irradiation surface for the first excitation light and the second excitation light. In this case, a field-of-view selection operation becomes unnecessary, and it is possible to simultaneously perform scanning and imaging of the sample. Therefore, improvement of a throughput until the first fluorescent light image and the second fluorescent light image are obtained can be achieved.

Further, the analysis unit may extract the area in which there is the sample by binarizing the second fluorescent light image. In this case, the area in which there is the sample can be accurately extracted through binarization.

Further, a wavelength of the first excitation light and a wavelength of the second excitation light may be different wavelengths or may be the same wavelengths. When the wavelength of the first excitation light and the wavelength of the second excitation light are different, excitation of different fluorescent substances is facilitated. Even when the wavelength of the first excitation light and the wavelength of the second excitation light are the same, the first fluorescent light image and the second fluorescent light image can be acquired in a case in which a wavelength of the first fluorescent light and a wavelength of the second fluorescent light are different.

Further, a wavelength of the first fluorescent light and a wavelength of the second fluorescent light may be different wavelengths or the same wavelengths. When the wavelength of the first fluorescent light and the wavelength of the second fluorescent light are different, it is easy to ascertain the area in which there is the sample from the second fluorescent light image. Even when the wavelength of the first fluorescent light and the wavelength of the second fluorescent light are the same, it is possible to acquire the first fluorescent light image and the second fluorescent light image by performing excitation with the first excitation light and excitation with the second excitation light at different timings in a case in which the excitation wavelength of the first fluorescent substance and the excitation wavelength of the second fluorescent substance are different.

A sample observation method according to an aspect of the present disclosure is a sample observation method for observing a sample using fluorescent light, the sample observation method including: a preparation step of holding the sample stained with a first fluorescent substance in a well of a sample container into which a solution including a second fluorescent substance has been injected; an irradiation step of irradiating the well with first excitation light for exciting the first fluorescent substance and second excitation light for exciting the second fluorescent substance; a scanning step of relatively scanning the sample container in one direction crossing optical axes of the first excitation light and the second excitation light; an image formation step of filming first fluorescent light generated in the sample due to the first excitation light and second fluorescent light generated in the solution due to the second excitation light as images; an imaging step of capturing at least a part of a light image of the first fluorescent light formed as an image in the image formation step and outputting first image data, and capturing at least a part of a light image of the second fluorescent light formed as an image in the image formation step and outputting second image data; an image processing step of generating a first fluorescent light image on the basis of a plurality of pieces of first image data obtained for the one direction, and generating a second fluorescent light image on the basis of a plurality of pieces of second image data obtained for the one direction; and an analysis step of specifying an area in which there is the sample on the basis of the second fluorescent light image, setting an analysis area in the first fluorescent light image on the basis of the area in which there is the sample, and analyzing an intensity of fluorescent light in the analysis area.

In this sample observation method, the first fluorescent light image is generated on the basis of the first fluorescent light from the first fluorescent substance with which the sample is stained, and the second fluorescent light image is generated on the basis of the second fluorescent light from the second fluorescent substance included in the solution. The area in which there is the sample can be ascertained from this second fluorescent light image. Therefore, the sample can be analyzed with high accuracy on the basis of an intensity of the fluorescent light in the analysis area in the first fluorescent light image by specifying the area in which there is the sample on the basis of the second fluorescent light image and setting the analysis area in the first fluorescent light image on the basis of the area in which there is the sample.

Further, the sample observation method may further include a switching step of switching between a first fluorescence filter that transmits the first fluorescent light and a second fluorescence filter that transmits the second fluorescent light on an optical path for image formation. In this case, splitting of the first fluorescent light and the second fluorescent light can be realized with a simple configuration.

Further, the sample observation method may further include a light splitting step of splitting the first fluorescent light and the second fluorescent light, and the imaging step may include a first imaging step of imaging at least a part of the first fluorescent light split by the light splitting element, and a second imaging step of imaging at least a part of the second fluorescent light split by the light splitting element. In this case, splitting of the first fluorescent light and the second fluorescent light can be realized with a simple configuration.

Further, the sample observation method may further include a light splitting step of splitting the first fluorescent light and the second fluorescent light by the light splitting element, and the imaging step may include imaging at least a part of the first fluorescent light split by the light splitting element in the first imaging area by a photodetector having a light reception surface including a first imaging area and a second imaging area, and imaging at least a part of the second fluorescent light split by the light splitting element in the second imaging area by the photodetector. In this case, splitting of the first fluorescent light and the second fluorescent light can be realized with a simple configuration.

Further, the image formation step may include forming the first fluorescent light and the second fluorescent light generated due to the irradiation with the planar light as images using the image formation unit having an observation axis that is inclined with respect to an irradiation surface. In this case, a field-of-view selection operation becomes unnecessary, and it is possible to simultaneously perform scanning and imaging of the sample. Therefore, improvement of a throughput until a fluorescent light image and a scattered light image are obtained can be achieved.

Further, the analysis step may include extracting the area in which there is the sample by binarizing the second fluorescent light image. In this case, the area in which there is the sample can be accurately extracted through binarization.

Advantageous Effects of Invention

According to the present disclosure, the analysis area can be specified with sufficient accuracy.

DESCRIPTION OF EMBODIMENTS

Hereinafter, preferred embodiments of a sample observation device and a sample observation method according to an aspect of the present disclosure will be described in detail with reference to the drawings.

Figure 1:
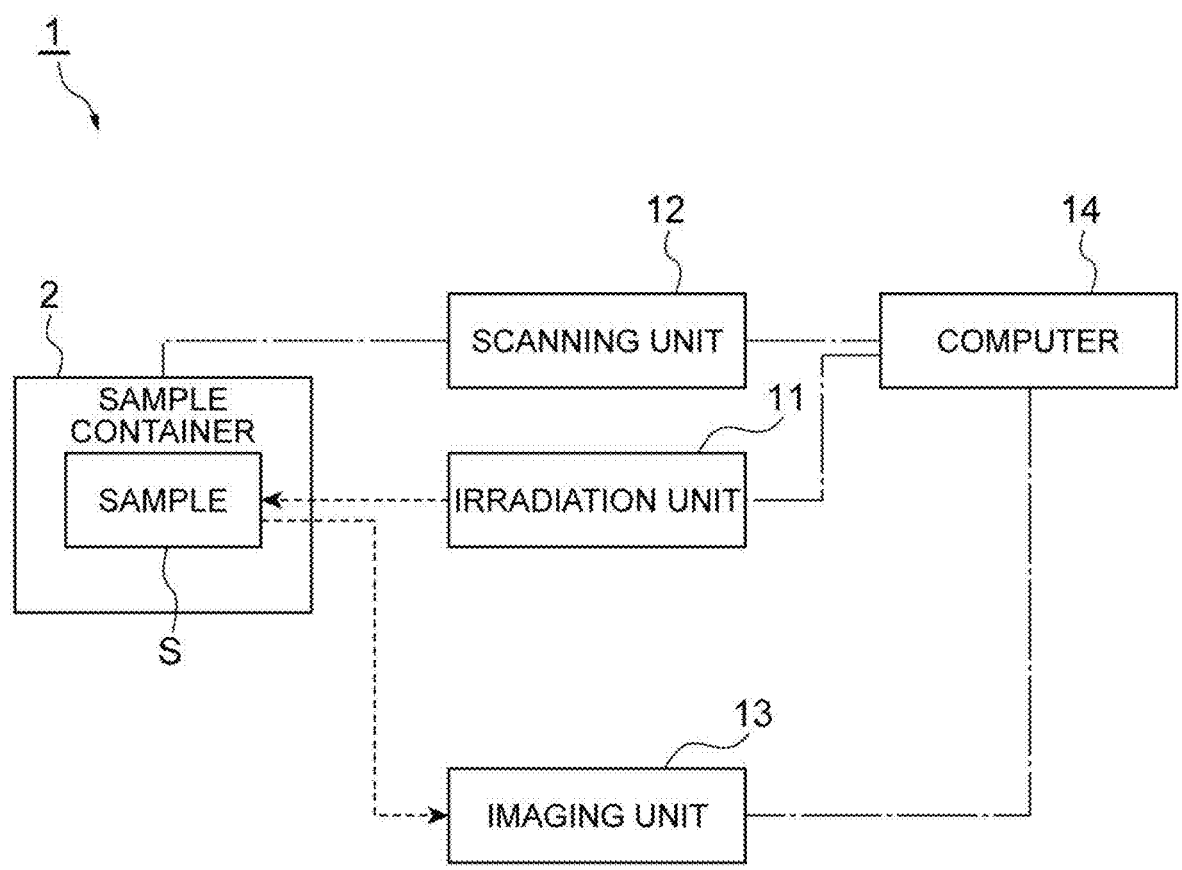
FIG. 1 is a block diagram illustrating an embodiment of a sample observation device.

FIG. 1 is a block diagram illustrating an embodiment of a sample observation device. The sample observation device 1 is a device that acquires observation image data of a sample S by causing fluorescent light from the sample S or the like to be formed as an image on an image formation surface, and analyzes and evaluates the sample S on the basis of the observation image data.

An example of this type of sample observation device includes a slide scanner that acquires and displays an image of the sample S held on a slide glass, or a plate reader that acquires image data of the sample S held on a microplate and analyzes the image data. Examples of the sample S that is an observation target include a cell and tissue of a human or an animal. The sample S is stained with a first fluorescent substance that is excited by first excitation light L1 (see FIG. 2). Examples of the first fluorescent substance include tetramethylrhodamine (excitation wavelength: 555 nm/fluorescent light wavelength: 580 nm). The sample S may be stained with a plurality of fluorescent substances.

Figure 2:
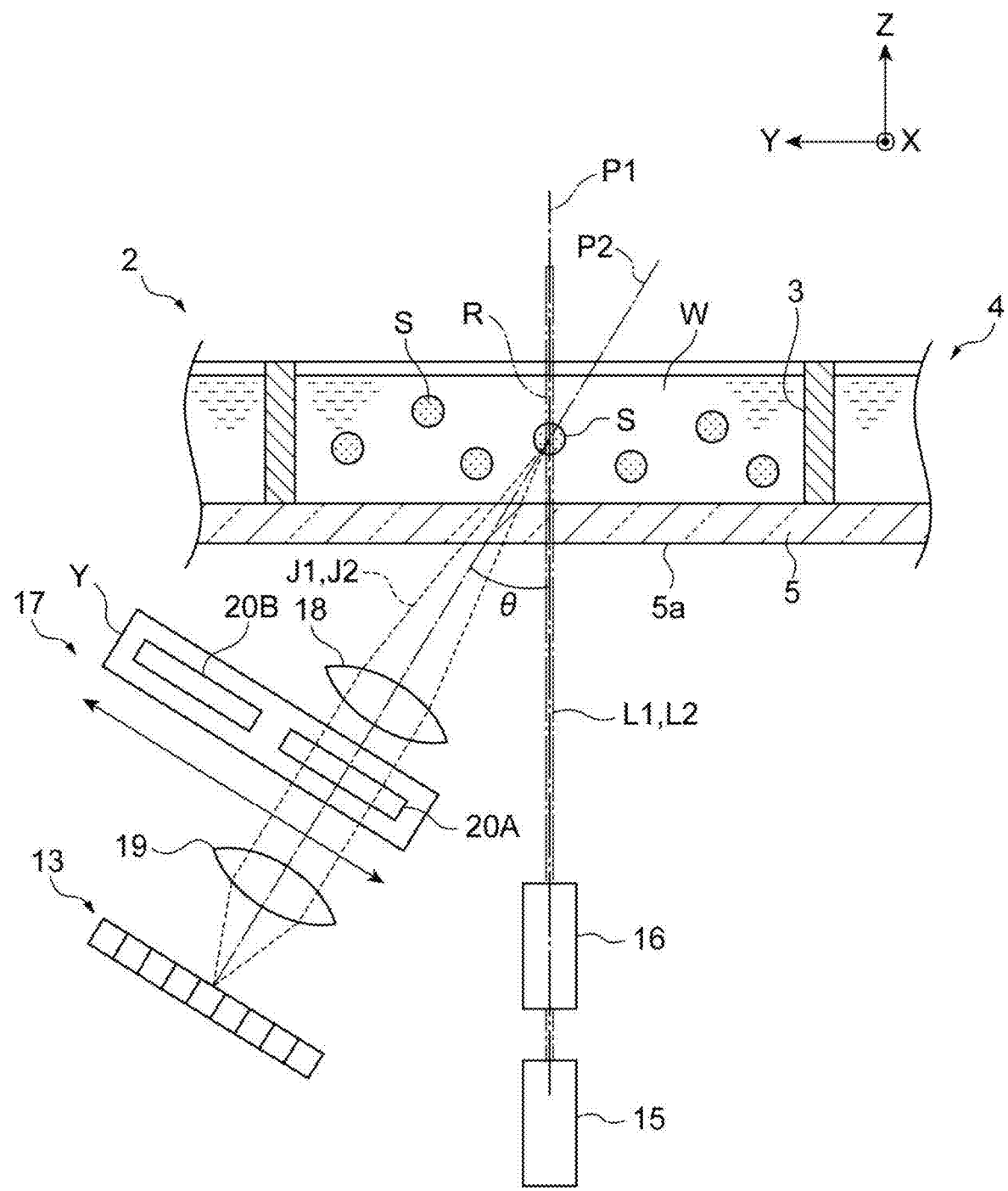
FIG. 2 is a schematic diagram illustrating a configuration example of an irradiation unit, a sample container, and an image formation unit in the sample observation device illustrated in FIG. 1.

The sample S is disposed in a sample container 2 as illustrated in FIG. 2. In the embodiment, the sample container 2 is, for example, a microplate. The sample container 2 includes a plate-like main body 4 in which a plurality of wells 3 in which the samples S are disposed are arranged in a straight line (or a matrix form), and a plate-like transparent member 5 provided to close one end side of the well 3 on one surface side of the main body 4.

When the sample S is disposed in the well 3, the solution W including the second fluorescent substance is injected into the well 3. The second fluorescent substance is a fluorescent substance that is excited by the second excitation light L2 having a wavelength different from that of the first excitation light L1 that excites the first fluorescent substance used to stain the sample S. Examples of the second fluorescent substance include fluorescein-dextran (excitation wavelength: 494 nm/fluorescent light wavelength: 521 nm). The solution W may include a plurality of fluorescent substances.

The transparent member 5 has an input surface 5a for the first excitation light L1 and the second excitation light L2 with respect to the sample S disposed in the well 3. A material of the transparent member 5 is not particularly limited as long as the material is a member having a high transmittance with respect to a wavelength of the first excitation light L1 and the second excitation light L2 (for example, a transmittance of 70% or more), but is, for example, a glass, quartz, or synthetic resin. The other end side of the well 3 is open to the outside.

As illustrated in FIG. 1, the sample observation device 1 includes an irradiation unit 11, a scanning unit 12, an imaging unit 13, and a computer 14. The irradiation unit 11 irradiates the well 3 in which the sample S is disposed with the first excitation light L1 and the second excitation light L2 that are planar light. The irradiation unit 11 includes a light source 15 and a planar light formation unit 16, as illustrated in FIG. 2. The light source 15 is, for example, a laser light source and is a wavelength selection laser light source capable of switching between outputs of the first excitation light L1 and the second excitation light L2. The first excitation light L1 and the second excitation light L2 output from the light source 15 are guided coaxially to the planar light formation unit 16. The irradiation unit 11 may separately include a light source that outputs the first excitation light L1 and a light source that outputs the second excitation light L2. In this case, the second excitation light L2 may be guided to the planar light formation unit 16 coaxially with the first excitation light L1 by an optical system. The light source 15 is not limited to the laser light source, and may be a light emitting diode (LED), a superluminescent diode (SLD), or a lamp light source.

The planar light formation unit 16 shapes the first excitation light L1 and the second excitation light L2 output from the light source 15 into planar light, and irradiates the sample S with the first excitation light L1 and the second excitation light L2 that have been shaped, along the optical axis P1. In the embodiment, an optical axis of the planar light formation unit 16 is the optical axis P1 of the first excitation light L1 and the second excitation light L2. The planar light formation unit 16 includes a light shaping element such as a cylindrical lens, an axicon lens, or a spatial light modulator, and is optically coupled to the light source 15. The planar light formation unit 16 may include an objective lens, an optical shutter, and the like.

The sample S and the solution W in the well 3 are irradiated with the first excitation light L1 and the second excitation light L2 formed by the irradiation unit 11. In the sample S irradiated with the first excitation light L1, the first fluorescent light J1 is generated due to the excitation of the first fluorescent substance with which the sample S is stained. Further, in the solution W irradiated with the second excitation light L2, the second fluorescent light J2 is generated due to the excitation of the second fluorescent substance in the solution W. When observation is performed in a thickness direction of the sample S, it is preferable for the planar light to be thin planar light having a thickness of 2 mm or less in consideration of resolution. Further, when a thickness of the sample S is very small, that is, when a sample S having a thickness equal to or less than Z-direction resolution is observed, a thickness of the planar light does not affect the resolution. In this case, planar light having a thickness exceeding 2 mm may be used.

The scanning unit (scanner) 12 is a mechanism that relatively scans the sample S with respect to the irradiation surface R for the first excitation light L1 and the second excitation light L2. The scanning unit 12 includes a moving stage that moves the sample container 2 that holds the samples S, for example. The moving stage scans the sample container 2 in a preset direction according to a control signal from the computer 14. In the embodiment, the moving stage scans the sample container 2 in one direction within a plane orthogonal to the optical axis P1 of the first excitation light L1 and the second excitation light L2.

In the following description, a direction of the optical axis P1 of the first excitation light L1 and the second excitation light L2 is referred to as an Z axis, a scanning direction of the sample container 2 according to the moving stage is referred to as a Y axis, and a direction orthogonal to the Y axis within the plane orthogonal to the optical axis P1 of the first excitation light L1 and the second excitation light L2 is referred to as an X axis, as illustrated in FIG. 2. The irradiation surface R for the first excitation light L1 and the second excitation light L2 with respect to the sample S is a surface within the XZ plane.

In the embodiment, an image formation unit 17 that forms images of the first fluorescent light J1 generated in the sample S due to the first excitation light L1 and the second fluorescent light J2 generated in the solution W due to the second excitation light L2 is provided, as illustrated in FIG. 2. The image formation unit 17 includes, for example, a collimator lens 18, an image formation lens 19, a first fluorescence filter 20A, a second fluorescence filter 20B, and a switching unit Y.

The collimator lens 18 is a lens that collimates the first fluorescent light J1 or the second fluorescent light J2 generated on the irradiation surface R. Further, the image formation lens 19 is a lens that forms an image of the first fluorescent light J1 or the second fluorescent light J2 that has been collimated by the collimator lens 18. The first fluorescence filter 20A is an optical filter that transmits the first fluorescent light J1 and cuts light having other wavelengths. The second fluorescence filter 20B is an optical filter that transmits the second fluorescent light J2 and cuts light having other wavelengths.

The switching unit Y includes, for example, a switching stage on which the first fluorescence filter 20A and the second fluorescence filter 20B are placed. The switching stage is disposed on an optical path for image formation between the collimator lens 18 and the image formation lens 19. The switching unit Y drives the switching stage in a direction crossing the optical axis of the image formation unit 17 in synchronization with driving of the light source 15 according to a control signal from the computer 14, and switches between the first fluorescence filter 20A that transmits the first fluorescent light J1 and the second fluorescence filter 20B that transmits the second fluorescent light J2, on the optical path for image formation. When the first excitation light L1 is output from the irradiation unit 11, the first fluorescence filter 20A advances onto the optical path for image formation and only the first fluorescent light J1 is imaged as an image by the image formation unit 17. On the other hand, when the second excitation light L2 is output from the irradiation unit 11, the second fluorescence filter 20B advances onto the optical path for image formation and only the second fluorescent light J2 is imaged as an image by the image formation unit 17. The switching unit Y may include a filter wheel on which the first fluorescence filter 20A and the second fluorescence filter 20B are placed.

The optical axis of the image formation unit 17 is an observation axis P2 of the first fluorescent light J1 and the second fluorescent light J2. This observation axis P2 is inclined at an inclination angle θ with respect to the irradiation surface R for the first excitation light L1 and the second excitation light L2. The inclination angle θ also matches an angle formed by the optical axis P1 of the first excitation light L1 and the second excitation light L2 directed to the sample S and the observation axis P2. The inclination angle θ is 10° to 80°. The inclination angle θ is preferably 20° to 70° from the viewpoint of improvement of resolution of the observation image. Further, the inclination angle θ is more preferably 30° to 65° from the viewpoint of improvement of the resolution of the observation image and stability of the field of view.

The imaging unit 13 captures at least a part of an optical image of the first fluorescent light J1 and at least a part of an optical image of the second fluorescent light J2 Banned as images by the image formation unit 17. An example of the photodetector constituting the imaging unit 13 includes an area image sensor such as a CMOS image sensor and a CCD image sensor. The area image sensor is disposed on an image formation surface of the image formation unit 17 and captures an optical image, for example, using a global shutter or a rolling shutter to generate two-dimensional image data.

The imaging unit 13 outputs first image data based on the at least the part of the light image of the first fluorescent light J1 and second image data based on the at least the part of the light image of the second fluorescent light J2 to the computer 14. As described above, in the sample observation device 1, the sample container 2 is scanned in a Y-axis direction (one direction) with respect to the irradiation surface R, and the light image of the first fluorescent light J1 and the light image of the second fluorescent light J2 from the irradiation surface R are captured by the imaging unit 13. That is, the imaging unit 13 generates a plurality of pieces of first image data (XZ images) and a plurality of pieces of second image data (XZ images) in the Y-axis direction.

Figure 3:
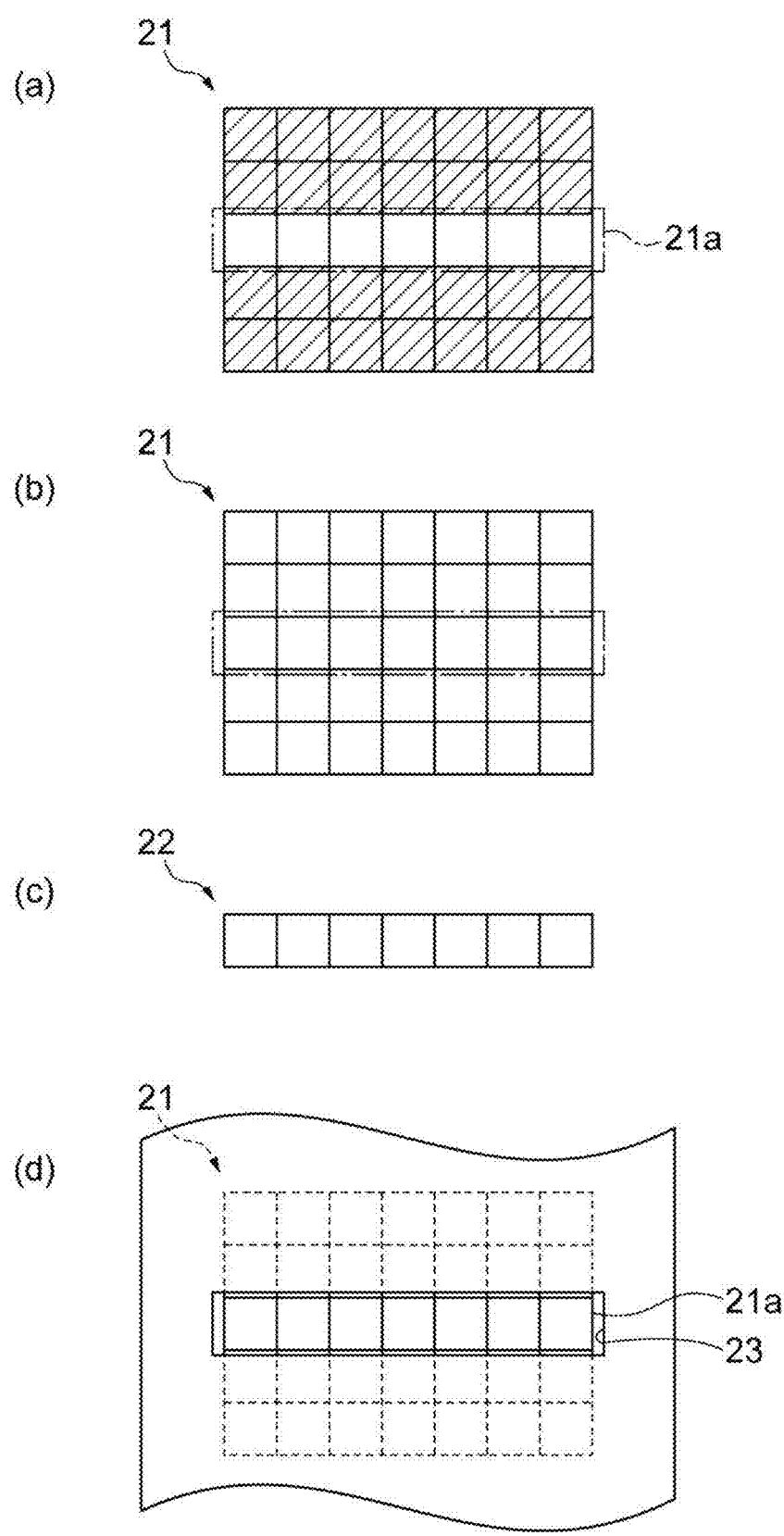
FIG. 3 is a diagram illustrating a configuration example of an imaging unit.

In the imaging unit 13, a line scan scheme may be applied to the photodetector to partially image the first fluorescent light J1 and the second fluorescent light J2 from the irradiation surface R. For example, as illustrated in FIG. 3(a), a subarray may be set on an imaging surface of the area image sensor 21. In this case, since only a pixel row 21a included in the subarray can be read, the light image of the first fluorescent light J1 or the second fluorescent light J2 can be partially captured. Further, all pixel rows of the area image sensor 21 may be used as a readout area, and a part of the two-dimensional image may be extracted through a subsequent image process, as illustrated in FIG. 3(b).

Further, partial imaging may be performed by using a photodetector such as a line sensor 22 instead of the area image sensor 21 and limiting the imaging surface itself to one pixel row, as illustrated in FIG. 3(c). As illustrated in FIG. 3(d), a slit 23 that transmits only a part of the first fluorescent light J1 or the second fluorescent light J2 may be disposed on a front surface of the area image sensor 21, and image data of the pixel row 21a corresponding to the slit 23 may be acquired. When the slit 23 is used, a photodetector such as a point sensor of a photomultiplier tube or the like may be used instead of the area image sensor.

The computer 14 physically includes a memory such as a RAM and a ROM, a processor (an arithmetic circuit) such as a CPU, a communication interface, a storage unit such as a hard disk, and a display unit such as a display. Examples of such a computer 14 include a personal computer, a microcomputer, a cloud server, and a smart device (a smart phone, a tablet terminal, or the like). The computer 14 functions as a controller that controls operations of the light source 15, the scanning unit 12, the switching unit Y, and the imaging unit 13 by a program stored in the memory being executed by a CPU of a computer system.

The computer 14 as the controller receives an input of a measurement start operation from the user, and drives the light source 15, the scanning unit 12, and the imaging unit 13 in synchronization. Accordingly, the sample container 2 is scanned in the Y direction with respect to the irradiation surface R for the first excitation light L1, and a plurality of XZ images of the first fluorescent light J1 on the irradiation surface R are captured by the imaging unit 13. Further, the sample container 2 is scanned in the Y direction with respect to the irradiation surface R for the second excitation light L2, and a plurality of XZ images of the second fluorescent light J2 on the irradiation surface R are captured by the imaging unit 13.

The computer 14 may control the light source 15 so that the light source 15 continuously outputs the first excitation light L1 or the second excitation light L2 during movement of the sample container 2 by the scanning unit 12, or may control ON/OFF of the output of the first excitation light L1 or the second excitation light L2 from the light source 15 according to the imaging in the imaging unit 13. Further, when the irradiation unit 11 includes an optical shutter, the computer 14 may turn ON/OFF the irradiation with the first excitation light L1 or the second excitation light L2 by controlling the optical shutter.

Figure 4:
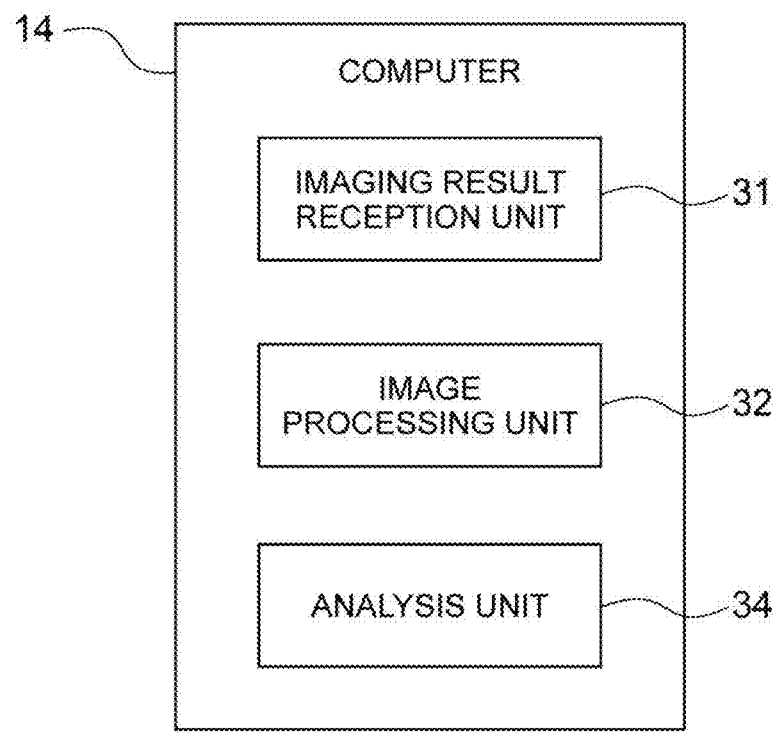
FIG. 4 is a block diagram illustrating an example of functional components of a computer constituting the sample observation device.

Further, the computer 14 includes an imaging result reception unit 31, an image processing unit 32, and an analysis unit 33 as functional components, as illustrated in FIG. 4. The imaging result reception unit 31 is a unit that receives imaging data from the imaging unit 13. That is, the imaging result reception unit 31 receives the first image data based on at least a part of the light image of the first fluorescent light J1 and the second image data based on at least a part of the light image of the second fluorescent light J2 from the imaging unit 13 and outputs the image data to the image processing unit 32.

Figure 5:
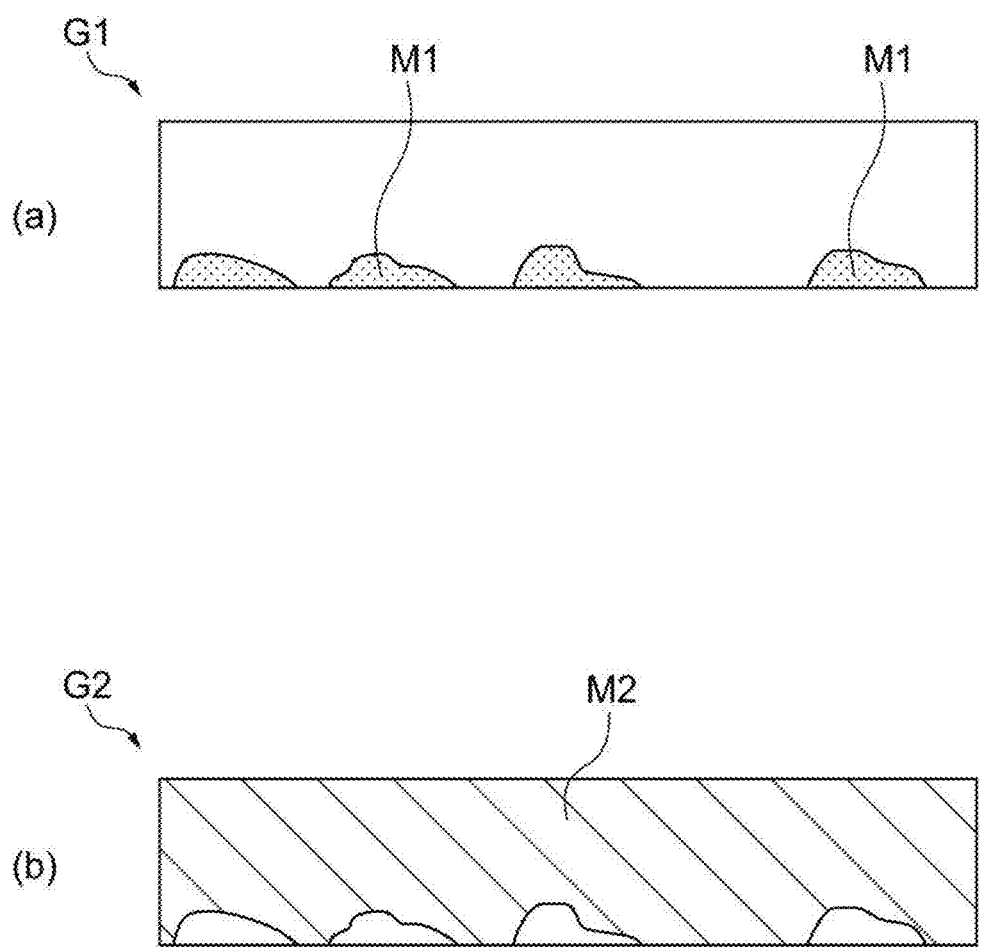
FIG. 5(a) is a diagram illustrating an example of first image data.
FIG. 5(b) is a diagram illustrating an example of second image data.

FIG. 5(a) illustrates an example of the first image data. The first image data G1 corresponds to an XZ image of the first fluorescent light J1 generated in the sample S. The first fluorescent light J1 is generated when the first fluorescent substance with which the sample S is stained is excited by the first excitation light L1. Therefore, the fluorescent light image M1 corresponding to the sample S can appear in the first image data G1. The second fluorescent substance included in the solution W in the well 3 is not excited by the first excitation light L1, and light other than the first fluorescent light J1 is cut by the first fluorescence filter 20A in the image formation unit 17. Therefore, in the first image data G1, the fluorescent light image of the area corresponding to the solution W does not appear.

FIG. 5(b) illustrates an example of the second image data. The second image data G2 corresponds to an XZ image of the second fluorescent light J2 generated in the solution W. The second fluorescent light J2 is generated when the second fluorescent substance included in the solution W is excited by the second excitation light L2. Therefore, the fluorescent light image M2 corresponding to the solution W can appear in the second image data G2. The first fluorescent substance with which the sample S is stained is not excited by the second excitation light L2, and light other than the second fluorescent light J2 is cut by the second fluorescence filter 20B in the image formation unit 17. Therefore, in the second image data G2, the fluorescent light image of the area corresponding to the sample S does not appear.

The image processing unit 32 generates a first fluorescent light image and a second fluorescent light image. The image processing unit 32 receives a plurality of pieces of first image data G1 obtained in the Y-axis direction and a plurality of pieces of second image data G2 obtained in the Y-axis direction from the imaging result reception unit 31. The image processing unit 32 compresses the plurality of received pieces of first image data G1 and the plurality of received pieces of second image data G2 in the Z direction. The image data compressed in the Z-axis direction indicates a luminance of the fluorescent light in the X-axis direction. The image processing unit 32 synthesizes, in the Y-axis direction, a plurality of pieces of image data compressed in the Z-axis direction, for the first image data G1 and the second image data G2, and integrates the luminance of the fluorescent light in each piece of image data to generate a first fluorescent light image and a second fluorescent light image. The image processing unit 32 outputs the first fluorescent light image and the second fluorescent light image that have been generated, to the analysis unit 33.

Figure 6:
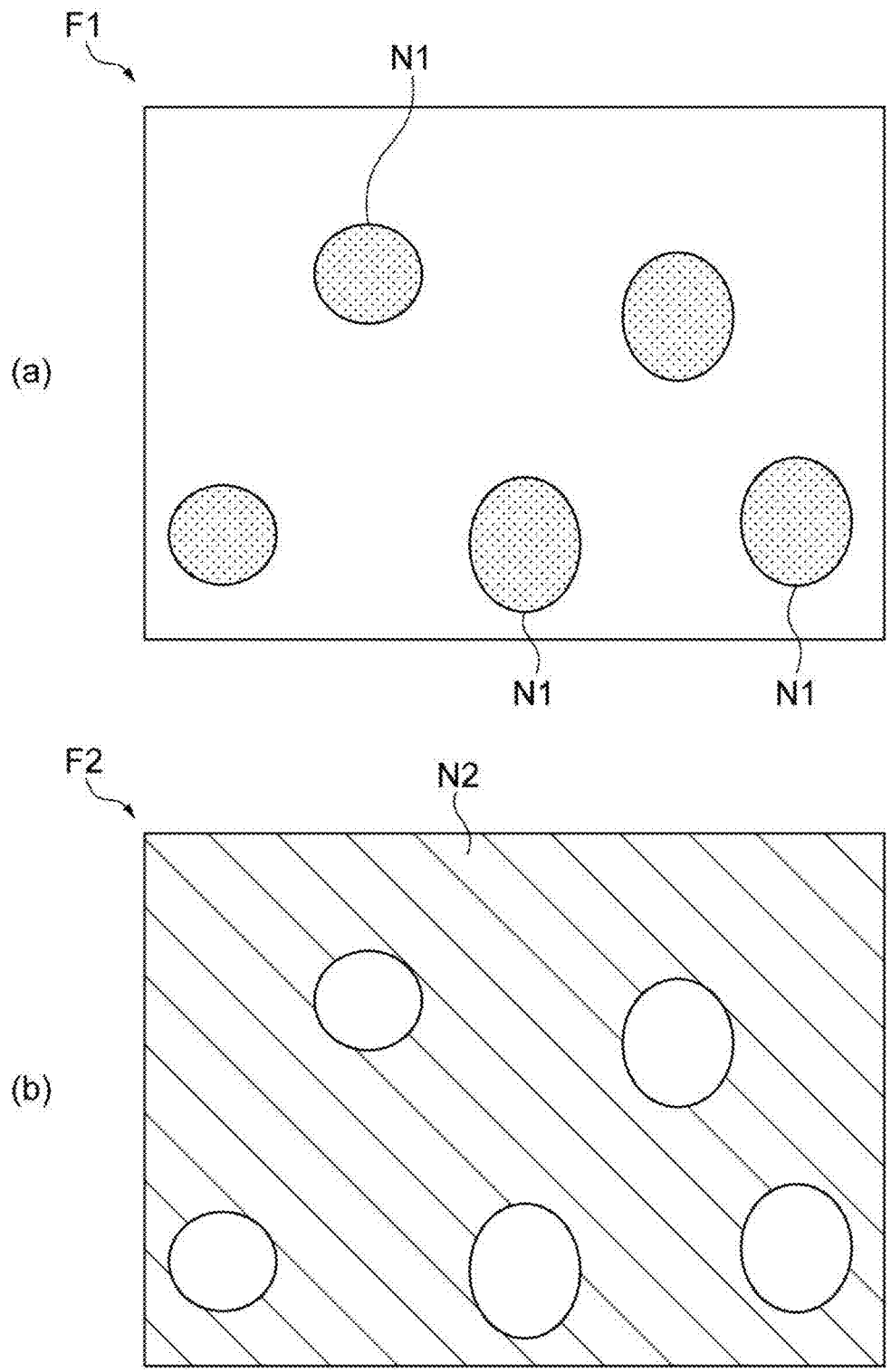
FIG. 6(a) is a diagram illustrating an example of a first fluorescent light image.
FIG. 6(b) is a diagram illustrating an example of a second fluorescent light image.

FIG. 6(a) illustrates an example of the first fluorescent light image. The first fluorescent light image F1 is an image obtained by synthesizing, in the Y-axis direction, the plurality of pieces of first image data G1 compressed in the Z-axis direction, and the fluorescent light image N1 appearing in the fluorescent light image F1 is an XY image of the fluorescent light corresponding to the sample S. Further, FIG. 6(b) illustrates an example of the second fluorescent light image. The second fluorescent light image F2 is an image obtained by synthesizing, in the Y-axis direction, the plurality of pieces of first image data G2 compressed in the Z-axis direction, and the fluorescent light image N2 appearing in the second fluorescent light image F2 is an XY image of the fluorescent light corresponding to the solution W.

Figure 7:
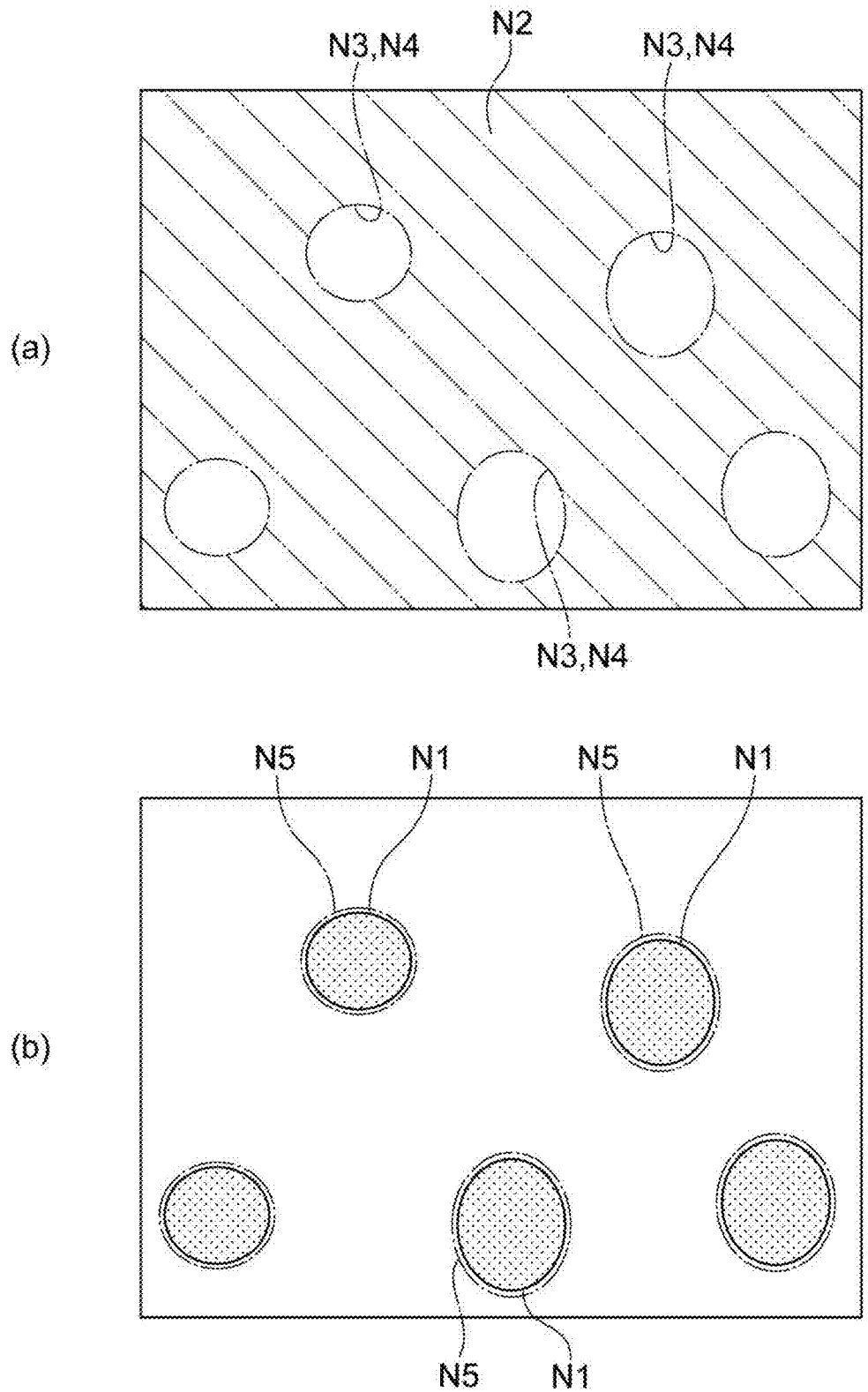
FIG. 7(a) is a diagram illustrating a state of extraction of an area in which there is a sample in the second fluorescent light image.
FIG. 7(b) is a diagram illustrating a state of setting an analysis area in the first fluorescent light image.

The analysis unit 33 analyzes the intensity of the fluorescent light in an analysis area N5 in the first fluorescent light image F1. When the analysis unit 33 receives the first fluorescent light image F1 and the second fluorescent light image F2 from the image processing unit 32, the analysis unit 33 first binarizes the second fluorescent light image F2 using a predetermined threshold value. Due to the binarization, a boundary between the fluorescent light image N2 corresponding to the solution W and an area N3 in which there is no fluorescent light image N2 becomes clear in the second fluorescent light image F2, as illustrated in FIG. 7(a). Then, the analysis unit 33 extracts the area N3 in which there is no fluorescent light image N2 as an area N4 in which there is the sample S. The analysis unit 33 assigns the extracted area N4 in which there is the sample S to the first fluorescent light image F1 as the analysis area N5, as illustrated in FIG. 7(b). The analysis unit 33 analyzes the intensity of the fluorescent light in the analysis area N5 on the basis of the fluorescent light image F1 through the assignment of the analysis area N5.

Figure 8:
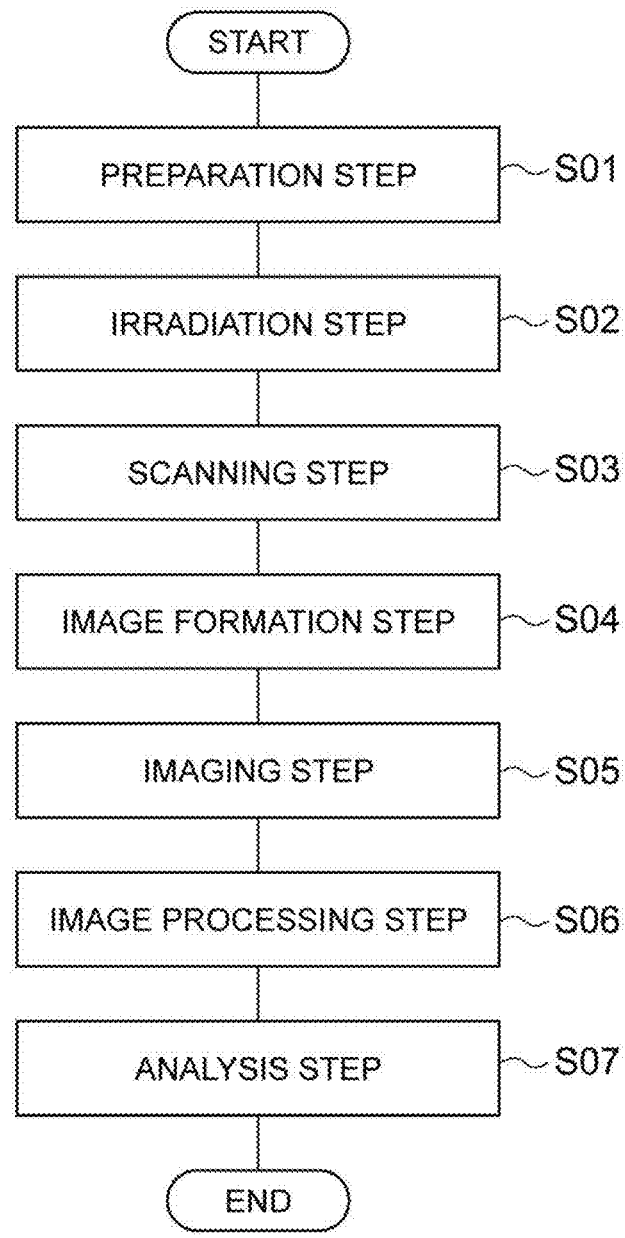
FIG. 8 is a flowchart illustrating an example of a sample observation method using the sample observation device illustrated in FIG. 1.

Next, a sample observation method using the sample observation device 1 described above will be described. FIG. 8 is a flowchart illustrating an example of the sample observation method using the sample observation device 1 illustrated in FIG. 1.

As illustrated in FIG. 8, this sample observation method includes a preparation step (step S01), an irradiation step (step S02), a scanning step (step S03), an image formation step (step S04), and an imaging step (step S05), an image processing step (step S06), and an analysis step (step S07).

In the preparation step, the sample S is held in the sample container 2. Here, the sample S is stained with the first fluorescent substance, and the solution W including the second fluorescent substance is injected into the well 3 together with the sample S. After the sample S and the solution W are held in the well 3, the sample container 2 is set in the scanning unit 12.

In the irradiation step, the well 3 of the sample container 2 is irradiated with the first excitation light L1 and the second excitation light L2. When a measurement start operation is input to the sample observation device 1 by the user, the light source 15 is driven on the basis of a control signal from the computer 14, and the first excitation light L1 or the second excitation light L2 is radiated. The first excitation light L1 or the second excitation light L2 is shaped by the planar light formation unit 16 to become the planar light, and the sample S and the solution W held in the sample container 2 is irradiated with the planar light.

In the scanning step, the sample container 2 is scanned with respect to the irradiation surface R for the first excitation light L1 and the second excitation light L2. When the measurement start operation is input by the user, the scanning unit 12 is driven in synchronization with the driving of the light source 15 on the basis of a control signal from the computer 14. Accordingly, the sample container 2 is linearly driven at a constant speed in the Y-axis direction, and the sample S in the well 3 is scanned with respect to the irradiation surface R for the first excitation light L1 and the second excitation light L2.

In the image formation step, the first fluorescent light J1 generated in the sample S due to the irradiation with the first excitation light L1 and the second fluorescent light J2 generated in the solution W due to the irradiation with the second excitation light L2 are formed as images. In the image formation step, the first fluorescent light J1 and the second fluorescent light J2 are formed as images with respect to the light reception surface of the photodetector according to the observation axis P2 inclined with respect to the irradiation surface R.

Further, in the image formation step, the switching unit Y may be driven according to a control signal from the computer 14 to switch between the first fluorescence filter 20A and the second fluorescence filter 20B on the optical path for image formation (switching step). In the switching step, when the first excitation light L1 is output from the irradiation unit 11, the first fluorescence filter 20A advances onto the optical path for image formation and only the first fluorescent light 31 is formed as an image by the image formation unit 17. On the other hand, when the second excitation light L2 is output from the irradiation unit 11, the second fluorescence filter 20B advances onto the optical path for image formation and only the second fluorescent light 32 is formed as an image by the image formation unit 17.

In the imaging step, at least a part of the optical image of the first fluorescent light 31 and at least a part of the optical image of the second fluorescent light J2 formed as images by the image formation unit 17 are captured. In the imaging step, a plurality of pieces of first image data G1 based on the at least a part of the optical image of the first fluorescent light J1 and a plurality of pieces of second image data G2 based on the at least a part of the optical image of the second fluorescent light J2 are generated in the Y-axis direction and output to the computer 14.

In the image processing step, the fluorescent light image F1 and the second fluorescent light image F2 are generated. In the image processing step, first, the plurality of pieces of first image data G1 and the plurality of pieces of second image data G2 obtained in the imaging step are compressed in the Z direction. Then, for each of the first image data G1 and the second image data G2, the plurality of pieces of image data compressed in the Z-axis direction is synthesized in the Y-axis direction, and luminance of the fluorescent light in each piece of image data is integrated. Accordingly, the fluorescent light image F1 that is an XY image of the fluorescent light corresponding to the sample S and the second fluorescent light image F2 that is an XY image of the fluorescent light corresponding to the solution W are generated.

In the analysis step, an intensity of the fluorescent light in the analysis area N5 in the first fluorescent light image F1 is analyzed. In the analysis step, first, the second fluorescent light image F2 is binarized using a predetermined threshold value, and in the second fluorescent light image F2, a boundary between the fluorescent light image N2 corresponding to the solution W and the area N3 in which there is no fluorescent light image N2 becomes clear. Then, in the analysis step, after the area N3 in which there is no fluorescent light image N2 is extracted as the area N4 in which there is the sample S, the area N4 in which there is the sample S is set as the analysis area N5, and the set analysis area N5 is assigned to the first fluorescent light image F1. In the analysis step, the intensity of the fluorescent light in the analysis area N5 is analyzed on the basis of the first fluorescent light image F1 through assignment of the analysis area N5.

As described above, the sample observation device 1 generates the first fluorescent light image F1 on the basis of the first fluorescent light J1 from the first fluorescent substance with which the sample S is stained, and generates the second fluorescent light image F2 on the basis of the second fluorescent light J2 from the second fluorescent substance included in the solution W. In the second fluorescent light image F2, an area in which the fluorescent light image N2 according to the second fluorescent light J2 does not appear is an area in which there is the sample S. Therefore, the area N4 in which there is the sample S can be specified with sufficient accuracy by the second fluorescent light image F2. In the related art, since light emission of the solution becomes noise, inclusion of a fluorescent substance in the solution has been avoided, whereas, in the embodiment, the second fluorescent substance is positively included in the solution W, and the analysis area N5 is set on the basis of the specified area N4 in which there is the sample S. Accordingly, the sample S can be analyzed with high accuracy on the basis of the intensity of the fluorescent light in the analysis area N5 in the first fluorescent light image F1.

Further, in the sample observation device 1, the switching unit Y that switches between the first fluorescence filter 20A that transmits the first fluorescent light J1 and the second fluorescence filter 20B that transmits the second fluorescent light J2, on the optical path for image formation is provided in the image formation unit 17. Accordingly, splitting of the first fluorescent light J1 and the second fluorescent light J2 can be realized with a simple configuration.

Further, in the sample observation device 1, the first excitation light L1 and the second excitation light L2 are shaped into the planar light by the planar light formation unit 16. Accordingly, in the imaging unit 13, it becomes possible to acquire the first image data G1 and the second image data G2 as two-dimensional data. Further, in the sample observation device 1, the image formation unit 17 has the observation axis P2 that is inclined with respect to the irradiation surface R for the first excitation light L1 and the second excitation light L2. Accordingly, a field-of-view selection operation becomes unnecessary, and scanning and imaging of the sample S can be performed simultaneously. Therefore, improvement of a throughput until the fluorescent light image F1 and the second fluorescent light image F2 are obtained can be achieved.

Further, in the sample observation device 1, the analysis unit 33 binarizes the second fluorescent light image F2 to extract the area N4 in which there is the sample S in the second fluorescent light image F2. According to such process, the area N4 in which there is the sample S in the second fluorescent light image F2 can be accurately extracted through the binarization. Therefore, the accuracy of the analysis of the sample S can be further improved.

Figure 9:
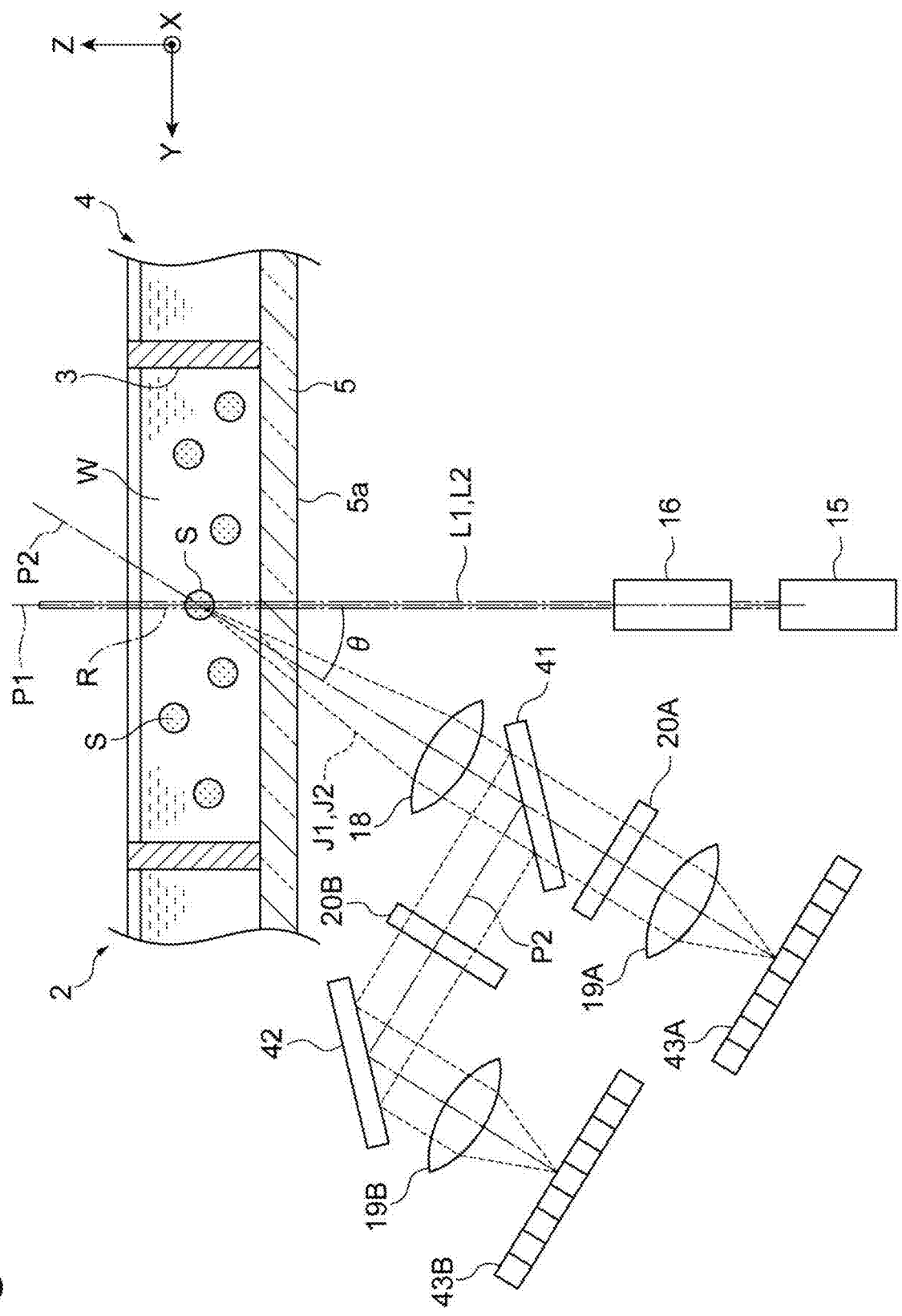
FIG. 9 is a schematic diagram illustrating a modification example of an image formation unit.

The present disclosure is not limited to the above embodiment. For example, in the image formation step, the first fluorescent light J1 and the second fluorescent light J2 generated in the sample S due to the irradiation with the planar light may be split by a light splitting element (a light splitting step). In this case, the image formation unit 17 includes a collimator lens 18, image formation lenses 19A and 19B, a beam splitter (light splitting element) 41, a mirror 42, a first fluorescence filter 20A, and a second fluorescence filter 20B, as illustrated in FIG. 9. In the example of FIG. 9, the imaging unit 13 may include a first photodetector 43A and a second photodetector 43B. As the beam splitter 41, for example, a dichroic mirror can be used.

The beam splitter 41 and the first fluorescence filter 20A are disposed on the optical path for image formation between the collimator lens 18 and the image formation lens 19A. The first fluorescent light J1 is collimated by the collimator lens 18 and transmitted through the beam splitter 41 and the first fluorescence filter 20A. The first fluorescent light J1 transmitted through the first fluorescence filter 20A is formed as an image on a light reception surface of the first photodetector 43A by the image formation lens 19A. The first photodetector 43A captures at least a part of the optical image of the first fluorescent light J1, and outputs the first image data G1 to the computer 14.

The second fluorescence filter 20B and the mirror 42 are disposed on the optical path for image formation between the collimator lens 18 and the image formation lens 19B. The second fluorescent light J2 is collimated by the collimator lens 18, reflected by the beam splitter 41, and then transmitted through the second fluorescence filter 20B. The second fluorescent light J2 transmitted through the second fluorescence filter 20B is reflected by the mirror 42 and formed as an image on a light reception surface of the second photodetector 43B by the image formation lens 19B. The second photodetector 43B captures at least a part of the optical image of the second fluorescent light J2, and outputs the second image data G2 to the computer 14. In such a configuration, splitting of the first fluorescent light J1 and the second fluorescent light J2 can be realized with a simple configuration.

Figure 10:
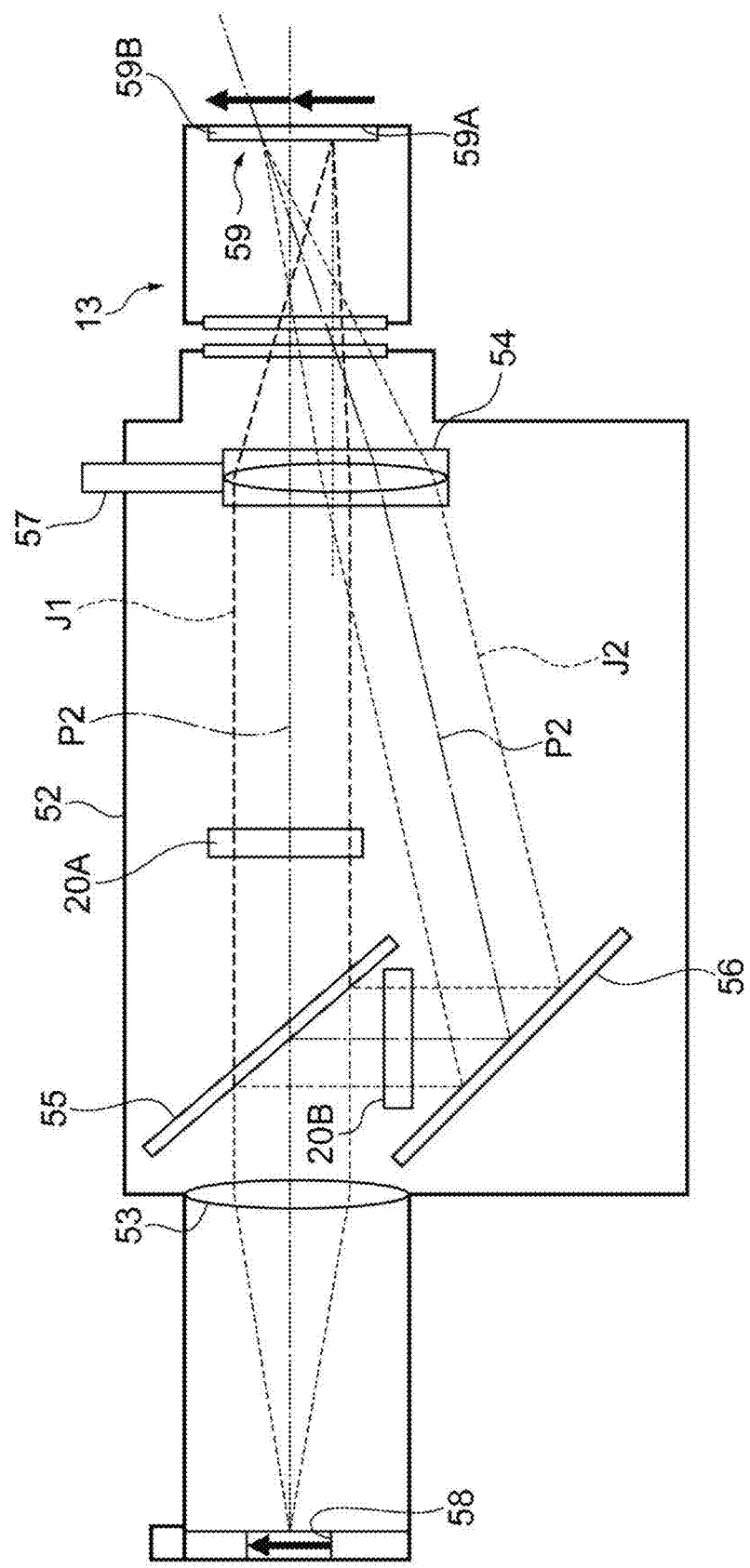
FIG. 10 is a schematic diagram illustrating a further modification example of the image formation unit.

Further, the image formation unit may include a light splitting device 51 as illustrated in FIG. 10. The light splitting device 51 includes a collimator lens 53, an image formation lens 54, a beam splitter (a light splitting element) 55, a mirror 56, a first fluorescence filter 20A, a second fluorescence filter 20B, and an image formation lens moving mechanism 57 in a housing 52. A field-of-view stop 58 is provided at a light incidence end of the housing 52. The field-of-view stop 58 has a variable width in a direction perpendicular to the observation axis P2. As the beam splitter 55, for example, a dichroic mirror can be used.

The beam splitter 55 and the first fluorescence filter 20A are disposed on the optical path for image formation between the collimator lens 53 and the image formation lens 54. The first fluorescent light J1 incident on the housing 52 through the field-of-view stop 58 is collimated by the collimator lens 53, transmitted through the beam splitter 55 and the first fluorescence filter 20A, and guided to the image formation lens 54. Further, the second fluorescence filter 20B and the mirror 56 are disposed on the optical path for image formation between the collimator lens 53 and the image formation lens 54. The second fluorescent light J2 incident on the housing 52 through the field-of-view stop 58 is collimated by the collimator lens 53, reflected by the beam splitter 55, and then transmitted through the second fluorescence filter 20B. The second fluorescent light J2 transmitted through the second fluorescence filter 20B is reflected by the mirror 56 and guided to the image formation lens 54.

Here, the image formation lens 54 is shifted by a predetermined distance from an optical axis of the first fluorescent light J1 by the image formation lens moving mechanism 57. Further, the photodetector 59 in the imaging unit 13 has a light reception surface including a first imaging area (a lower half area of the photodetector 59 in FIG. 10) 59A and a second imaging area (an upper half area of the photodetector 59 in FIG. 10) 59B. Accordingly, the first fluorescent light J1 formed as an image by the image formation lens 54 is formed as an image in the first imaging area 59A of the photodetector 59 in the imaging unit 13, whereas the second fluorescent light J2 formed as an image by the image formation lens 54 is formed as an image in the second imaging area 59B of the photodetector 59 in the imaging unit 13. The photodetector 59 captures at least a part of the light image of the first fluorescent light J1 in the first imaging area 59A, and captures at least a part of the light image of the second fluorescent light J2 in the second imaging area 59B. In such a configuration, splitting of the first fluorescent light J1 and the second fluorescent light J2 can be realized with a simple configuration.

Further, although the irradiation unit 11 that outputs the planar light and the imaging unit 13 that adopts the line scan scheme are combined, for example, in the above-described embodiment, another scheme may be adopted as long as a cross section in a depth direction of the well 3 in the sample container 2 can be measured at a time. For example, an optical system of oblique plane microscopy described in U.S. Pat. No. 8,582,203 may be adopted.

Further, the imaging of the first fluorescent light J1 due to the irradiation with the first excitation light L1 and the imaging of the second fluorescent light J2 due to the irradiation with the second excitation light L2 may be performed simultaneously or at different timings.

The wavelength of the first excitation light L1 and the wavelength of the second excitation light L2 may be different wavelengths or the same wavelengths. When the wavelength of the first excitation light L1 and the wavelength of the second excitation light L2 are different, excitation of different fluorescent substances is facilitated. Even when the wavelength of the first excitation light L1 and the wavelength of the second excitation light L2 are the same, the first fluorescent light image F1 and the second fluorescent light image F2 can be acquired in a case in which a wavelength of the first fluorescent light J1 and a wavelength of the second fluorescent light J2 are different.

Further, the wavelength of the first fluorescent light J1 and the wavelength of the second fluorescent light J2 may be different wavelengths or the same wavelengths. When the wavelength of the first fluorescent light J1 and the wavelength of the second fluorescent light J2 are different, it is easy to ascertain the area in which there is the sample from the second fluorescent light image F2. Even when the wavelength of the first fluorescent light J1 and the wavelength of the second fluorescent light J2 are the same, it is possible to acquire the first fluorescent light image F1 and the second fluorescent light image F2 by performing excitation with the first excitation light L1 and excitation with the second excitation light L2 at different timings in a case in which the excitation wavelength of the first fluorescent substance and the excitation wavelength of the second fluorescent substance are different.

Figure 11:
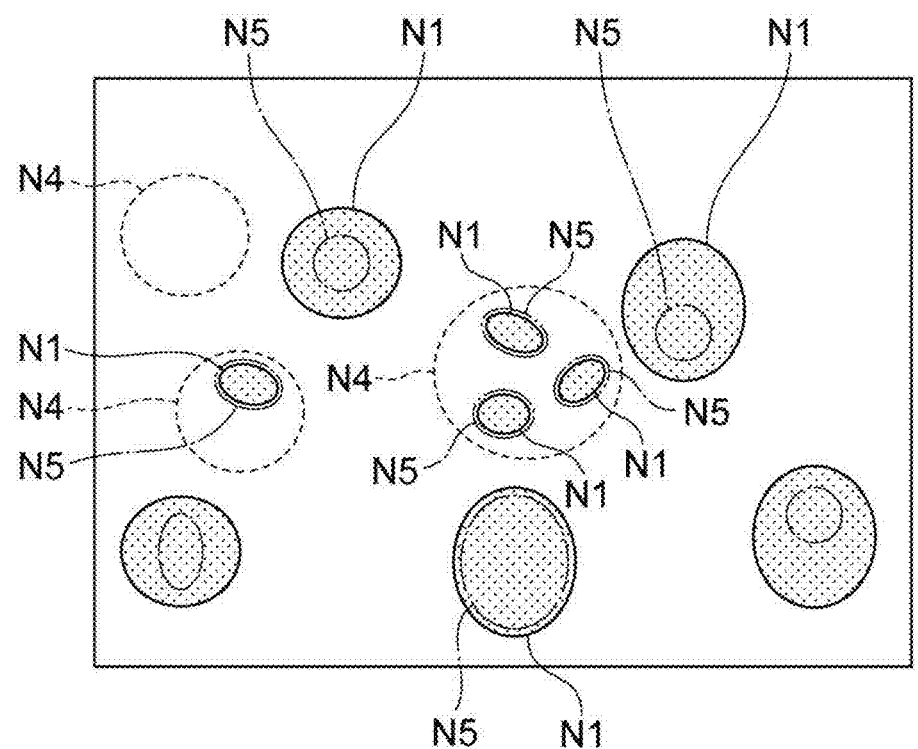
FIG. 11 is a diagram illustrating a modification example of a state of setting of the analysis area in the fluorescent light image.

Further, the area N4 in which there is the sample S and the analysis area N5 do not necessarily match each other. For example, the analysis area N5 may be set partially inside the fluorescent light image N1 appearing in the first fluorescent light image F1 (inside the area N4 in which there is the sample S), as illustrated in FIG. 11. When the fluorescent light image N1 is present in a part inside the area N4 in which there is the sample S, the entire fluorescent light image N1 may be set as the analysis area N5. When a plurality of fluorescent light images N1 are present inside the area N4 in which there is the sample S, each of the plurality of entire fluorescent light images N1 may be set as the analysis area N5. When the fluorescent light image N1 appearing in the first fluorescent light image F1 is not present inside the area N4 in which there is the sample S, the analysis area N5 may not be set.

REFERENCE SIGNS LIST

1: Sample observation device
2: Sample container
3: Well
11: Irradiation unit
12: Scanning unit
13: Imaging unit
17: Image formation unit
20A: First fluorescence filter
20B: Second fluorescence filter
32: Image processing unit
33: Analysis unit
41: Beam splitter (light splitting element)
43A: First photodetector
43B: Second photodetector
51: Light splitting device (image formation unit)
55: Beam splitter (light splitting element)
59: Photodetector
59A: First imaging area
59B: Second imaging area
L1: first excitation light
L2: second excitation light
J1: First fluorescent light
J2: Second fluorescent light
G1: First image data
G2: Second image data
F1: First fluorescent light image
F2: Second fluorescent light image
N4: Area in which there is sample
N5: Analysis area
S: Sample
R: Irradiation surface
P2: Observation axis
W: Solution
Y: Switching unit

The invention claimed is:

1. A device comprising:
a sample container positioned in an X-Y plane configured to hold a sample stained with a first fluorescent substance in a well into which a solution including a second fluorescent substance has been injected;
an irradiation unit comprising a light source and a planar light formation unit configured to irradiate the well with first excitation light for exciting the first fluorescent substance and second excitation light for exciting the second fluorescent substance;
a scanner configured to relatively scan the sample container in a Y-axis direction crossing optical axes extending in a Z-axis direction of the first excitation light and the second excitation light;
an image formation unit comprising a collimator lens and an image formation lens configured to form first fluorescent light generated in the sample due to the first excitation light and second fluorescent light generated in the solution due to the second excitation light as images;
an imaging unit comprising an area image sensor configured to capture at least a part of a light image of the first fluorescent light formed as an image by the image formation unit and outputs first image data, and to capture at least a part of a light image of the second fluorescent light formed as an image by the image formation unit and outputs second image data;
an image processor configured to generate a first fluorescent light image on the basis of a plurality of pieces of first image data obtained for the Y-axis direction, and to generate a second fluorescent light image on the basis of a plurality of pieces of second image data obtained for the Y-axis direction; and
an analyzer configured to specify an area in which there is the sample on the basis of the second fluorescent light image, sets an analysis area in the first fluorescent light image on the basis of the area in which there is the sample, and analyzes an intensity of fluorescent light in the analysis area,
wherein the first excitation light and the second excitation light are planar light in an X-Z plane,
wherein the image processor compresses the plurality of pieces of second image data in the Z-axis direction, and forms the second fluorescent image by synthesizing a plurality of compressed image data in the Y-axis direction, and
wherein the analyzer extracts the area in which there is the sample by binarizing the second fluorescent light image into two values.

2. The device according to claim 1, wherein the image formation unit includes a switching unit comprising a switching stage configured to switch between a first fluorescence filter configured to transmit the first fluorescent light and a second fluorescence filter configured to transmit the second fluorescent light on an optical path for image formation.

3. The device according to claim 1,
wherein the image formation unit includes a light splitter configured to split the first fluorescent light and the second fluorescent light, and
the imaging unit includes a first photodetector configured to image at least a part of the first fluorescent light split by the light splitting element, and a second photodetector configured to image at least a part of the second fluorescent light split by the light splitter.

4. The device according to claim 1,
wherein the image formation unit includes a light splitter configured to split the first fluorescent light and the second fluorescent light, and
the imaging unit includes a photodetector including a first imaging area that images at least a part of the first fluorescent light split by the light splitter and a second imaging area that images at least a part of the second fluorescent light split by the light splitter.

5. The device according to claim 1, wherein the image formation unit has an observation axis that is inclined with respect to an irradiation surface for the first excitation light and the second excitation light.

6. The device according to claim 1, wherein a wavelength of the first excitation light and a wavelength of the second excitation light are different wavelengths.

7. The device according to claim 1, wherein a wavelength of the first excitation light and a wavelength of the second excitation light are the same wavelengths.

8. The device according to claim 1, wherein a wavelength of the first fluorescent light and a wavelength of the second fluorescent light are different wavelengths.

9. The device according to claim 1, wherein a wavelength of the first fluorescent light and a wavelength of the second fluorescent light are the same wavelengths.

10. A method comprising:
holding a sample stained with a first fluorescent substance in a well of a sample container positioned in an X-Y plane into which a solution including a second fluorescent substance has been injected;
irradiating the well with first excitation light for exciting the first fluorescent substance and second excitation light for exciting the second fluorescent substance, the first excitation light and the second excitation light being planar light in an X-Z plane;
relatively scanning the sample container in a Y-axis direction crossing optical axes extending in a Z-axis direction of the first excitation light and the second excitation light;
forming first fluorescent light generated in the sample due to the first excitation light and second fluorescent light generated in the solution due to the second excitation light as images;
capturing at least a part of a light image of the first fluorescent light formed as an image and outputting first image data, and capturing at least a part of a light image of the second fluorescent light formed as an image and outputting second image data;
generating a first fluorescent light image on the basis of a plurality of pieces of first image data obtained for the Y-axis direction, and generating a second fluorescent light image on the basis of a plurality of pieces of second image data obtained for the Y-axis direction;
specifying an area in which there is the sample on the basis of the second fluorescent light image, setting an analysis area in the first fluorescent light image on the basis of the area in which there is the sample, and analyzing an intensity of fluorescent light in the analysis area,
compressing the plurality of pieces of second image data in the Z-axis direction, and forming the second fluorescent image by synthesizing a plurality of compressed image data in the Y-axis direction, and
extracting the area in which there is the sample by binarizing the second fluorescent light image into two values.

11. The method according to claim 10, further comprising:
switching between a first fluorescence filter configured to transmit the first fluorescent light and a second fluorescence filter configured to transmit the second fluorescent light on an optical path for image formation.

12. The method according to claim 10, further comprising:
splitting the first fluorescent light and the second fluorescent light; and
imaging with a first photodetector at least a part of the first fluorescent light, and imaging with a second photodetector at least a part of the second fluorescent light.

13. The method according to claim 10, further comprising:
splitting the first fluorescent light and the second fluorescent light, and
imaging with a photodetector a first imaging area that images at least a part of the first fluorescent light and a second imaging area that images at least a part of the second fluorescent light split.

14. The method according to claim 10, wherein a wavelength of the first excitation light and a wavelength of the second excitation light are different wavelengths.

15. The method according to claim 10, wherein a wavelength of the first excitation light and a wavelength of the second excitation light are the same wavelengths.

16. The method according to claim 10, wherein a wavelength of the first fluorescent light and a wavelength of the second fluorescent light are different wavelengths.

17. The method according to claim 10, wherein a wavelength of the first fluorescent light and a wavelength of the second fluorescent light are the same wavelengths.

* * * * *